Jan. 12, 1954   P. J. MORE   2,665,439
MOTOR-DRIVEN POLISHER HAVING UPPER AND LOWER CASING SECTIONS
Filed June 22, 1948   2 Sheets-Sheet 1
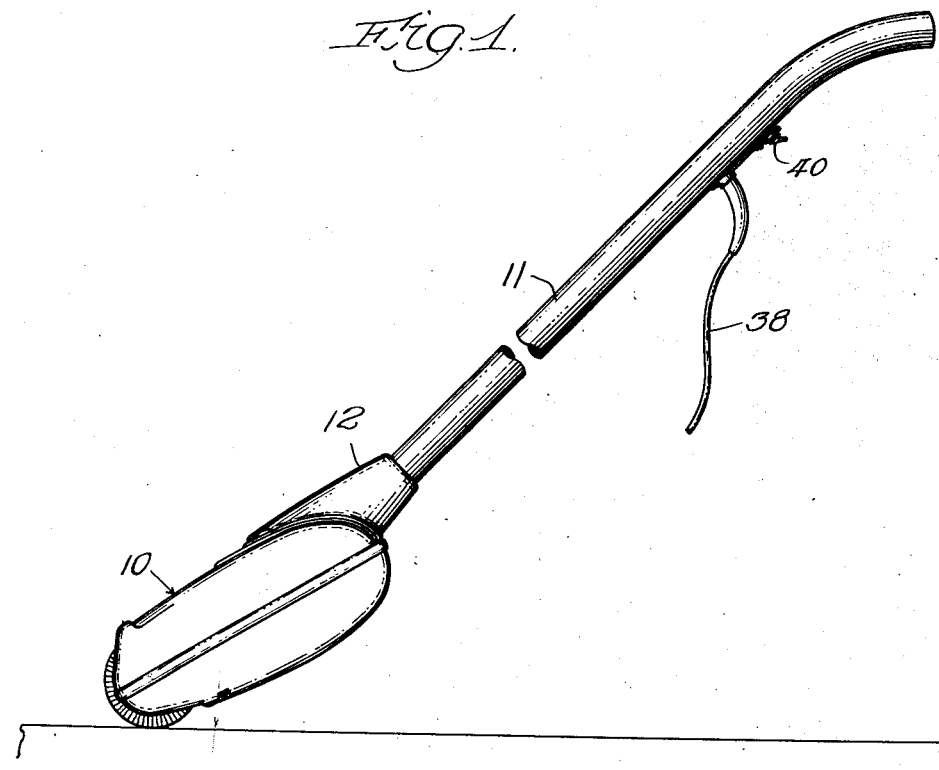
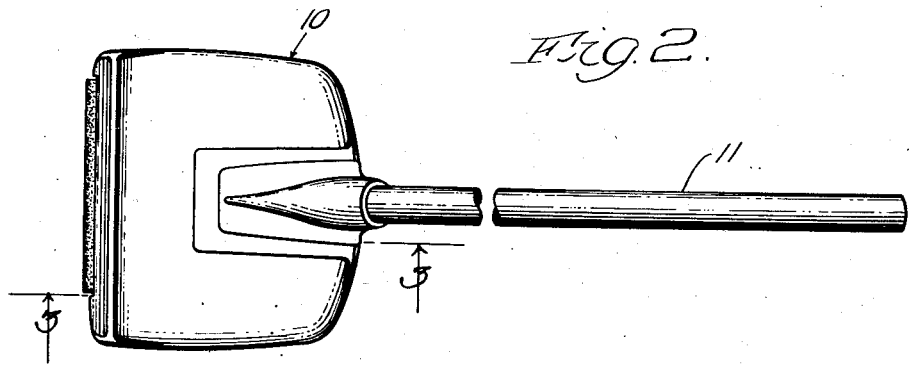
Inventor:
Philip J. More,
By Chritton, Schroeder,
Merriam & Hofgren, Attys.

Jan. 12, 1954 P. J. MORE 2,665,439
MOTOR-DRIVEN POLISHER HAVING UPPER AND LOWER CASING SECTIONS
Filed June 22, 1948 2 Sheets-Sheet 2
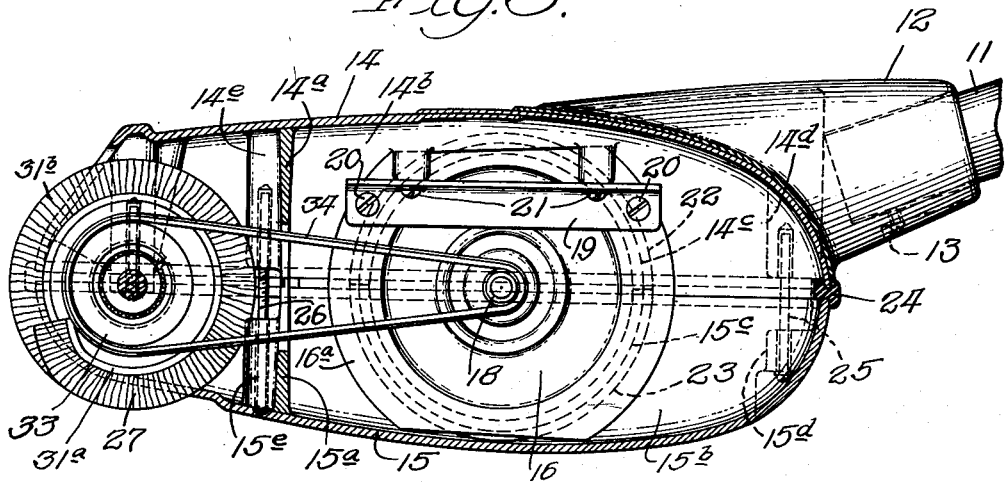
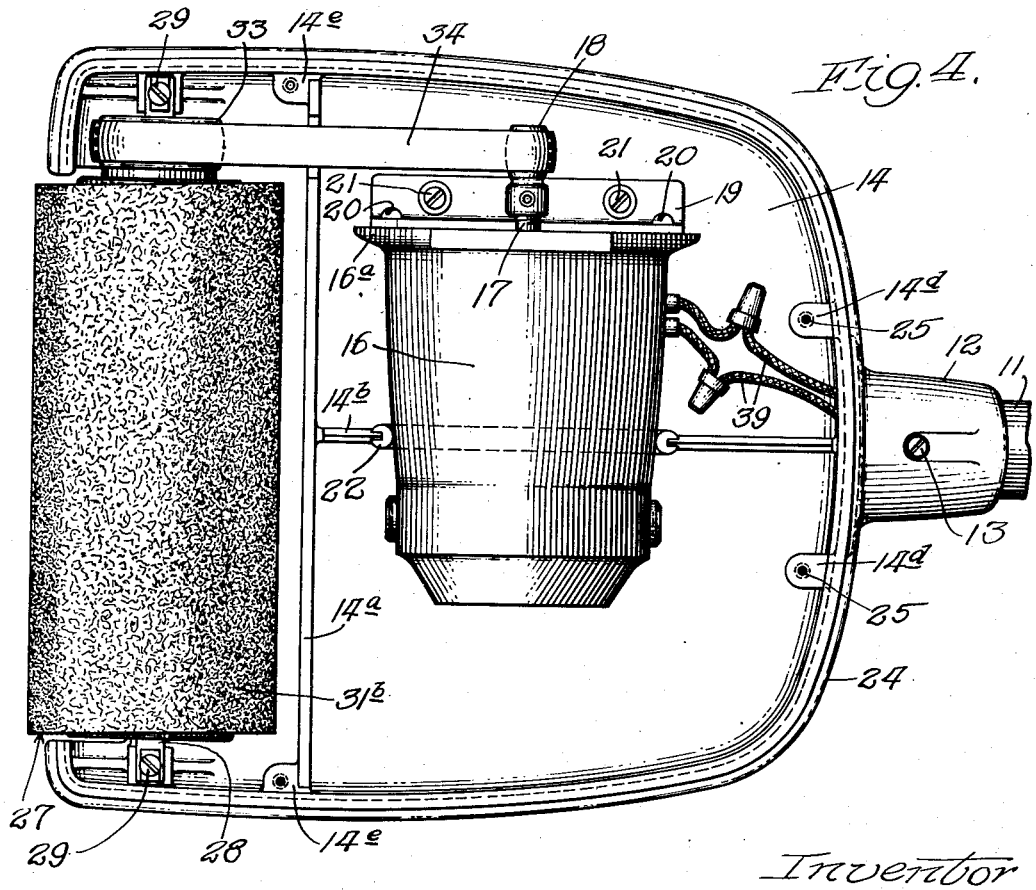
Inventor
Philip J. More,
By Chritton, Schroeder,
Merriam & Hofgren, Attys.

Patented Jan. 12, 1954

2,665,439

UNITED STATES PATENT OFFICE 2,665,439

MOTOR-DRIVEN POLISHER HAVING UPPER AND LOWER CASING SECTIONS

Philip J. More, Chicago, Ill., assignor to Birtman Electric Company, a corporation of Illinois Application June 22, 1948, Serial No. 34,516

3 Claims. (Cl. 15—98)

This invention relates to a motor-driven polisher adapted to be used for polishing floors and the like.

The new polisher of this invention employs a motor-driven rotatable polisher member for polishing floors and the like. While the polisher is being used, the entire weight thereof is adapted to be borne by the polisher member so that sufficient pressure will be exerted thereon to produce an efficient polishing action. The various elements of the new polisher are easily accessible for cleaning and repair when these are necessary. An important feature of the new polisher is the provision of upper and lower interfitted casing sections with the motor and polisher member being mounted on one section so that access may be had to these elements by merely removing the other casing section. It is preferred that the handle also be attached to the casing section that carries the motor and the polisher member. The new polisher also involves an improved mounting for the motor so that the motor may be easily and quickly removed from the remainder of the polisher. There is also provided an improved polisher member having a readily replaceable buffer member forming a part thereof. There is also provided improved mounting means for the polisher member and an improved driving means therefor.

The new polisher is quite compact, yet sturdy and because of the arrangement of the various parts thereof provides an efficient polishing action. The invention will be described as related to the embodiments shown in the drawings. Of the drawings:

Fig. 1 is a side elevation of a polisher embodying the invention; Fig. 2 is a plan view thereof; Fig. 3 is a longitudinal section taken through the polisher body substantially along the line 3—3 of Fig. 2; and Fig. 4 is a bottom view of the body of the polisher with the bottom casing section removed.

The motor-driven polisher shown in the accompanying drawings comprises a body portion 10 and an elongated handle 11 rigidly attached thereto. The handle 11 is removably held in its socket 12 by means of a small set screw 13. The body portion 10 of the polisher comprises a top casing section 14 and a bottom casing section 15. These two casing sections are held in interfitted relationship to form the casing of the polisher as is shown in Fig. 3.

Located within the casing sections 14 and 15 is a motor 16. This motor is provided with a shaft 17 extending from one end thereof with this shaft being provided with a belt spindle 18. The motor is mounted on the inner surface of the top casing section 14 by a bracket 19. This bracket is removably attached to a flange 16a at the shaft end of the motor 16 by means of screws 20. The bracket 19 is attached to the inner surface of the top casing section 14 by means of screws 21. As shown in the drawings, the bracket 19 is of right angle cross-section and supports the motor at one end only thereof. With this arrangement the motor may be readily removed from the casing.

The top casing section 14 is provided with a transverse wall 14a spaced from the front of the casing section. The bottom casing section is provided with a similar transverse wall 15a with these walls arranged in abutting relationship to provide a transverse partition in the casing. The top casing section 14 is also provided with a longitudinal wall 14b extending from the transverse wall 14a to the rear of the casing section, and located substantially midway between the sides of the casing section. The bottom casing section is provided with a similar longitudinal wall 15b arranged in abutting relationship with the longitudinal wall 14b to provide a longitudinal partition in the polisher casing. The wall 14b is provided with a concave portion 14c of substantially semi-circular shape. The wall 15b is also provided with a similar concave portion 15c of substantially semi-circular shape. The concave portion 14c is provided with a flexible resilient gasket member 22, while the concave portion 15c is provided with a similar gasket member 23. These portions and gasket members are adapted to embrace the motor 16 adjacent the rear thereof and form a further support for the motor, as shown in Figs. 3 and 4. With this arrangement, the longitudinal walls 14b and 15b serve to hold the motor firmly while the gasket members 22 and 23 absorb a large portion of the vibration of the motor. The adjacent edges of the casing sections 14 and 15 are provided with a flexible resilient gasket member 24 therebetween. The gasket member 24 has a relatively wide outer surface that serves as a bumper strip to prevent scarring of furniture and walls. The two casing sections 14 and 15 are held in assembled relationship by elongated threaded bolts 25 and 26. These threaded bolts extend through thickened portions 15d and 15e located on the inner surface of the bottom casing section 15. The bolts engage thickened portions 14d and 14e on the inner surface of the top casing section 14. These bolts 25 and 26 have their heads exposed so that the bottom casing section may be easily removed from the top casing section by merely removing the bolts.

In the space at the front of the casing, beyond the transverse walls 14a and 15a, there is located a rotatable hollow polisher member 27. This polisher member is rotatably mounted on an axle 28. The axle is rigidly attached at each end thereof to the top casing section 14 by means of threaded bolts 29. Each bolt extends through its end of the axle so that the axle is held against rotation.

The polisher member 27, which is rotatably mounted on the axle 28, comprises a substantially cylindrical body portion 30 having a buffer member 31 attached to the outer surface thereof. This buffer member comprises a backing portion 31a held on the body portion 30 and a buffer portion 31b of cotton, wool, or the like attached thereto. The buffer member 31 is preferably in the form of an elongated strip of material, as indicated at 31b, arranged in helical coils on the surface of the body portion 30. The adjacent coils are preferably in contact with each other so as to provide a continuous buffing surface. One end of the strip is attached to a depressed portion 30a at one end of the body portion 30, while the other end of the strip is attached to a similar depressed portion at the other end of the body portion 30. With this arrangement, the buffer member 31 may be easily removed from the body portion 30 of the polisher member when it is necessary to replace the buffer. It is preferred that the backing portion 31a of the buffer 31 be attached to the body portion by means of an adhesive such as rubber cement.

The end of the body portion 30 of the buffer member that is adjacent the motor shaft 17 is provided with a spindle 33. This spindle is aligned with the spindle 18 on the motor shaft 17 and both spindles are connected by a driving belt 34. The belt extends through openings provided in the transverse walls 14a and 15a. It is preferred that the buffer spindle 33 have a diameter considerably greater than that of the motor spindle 18.

As can be seen from the above description, the new polisher is very simple in construction, yet is quite sturdy and all operating parts are readily accessible for inspection and the like. The motor 16 is supplied with electric current through the usual cord 38 attached near the upper end of the handle 11. The electrical leads 39 to the motor extend down through the handle. Mounted on the handle is the usual switch 40 for starting and stopping the motor.

Having described my invention as related to the embodiment shown in the accompanying drawings, it is my intention that the invention be not limited by any of the details of description unless otherwise specified but rather be construed broadly within its spirit and scope as set out in the accompanying claims.

I claim:

1. A motor-driven polisher comprising a substantially integral upper casing section, a motor fixed to this upper section, a motor driven rotatable polisher member fixed to the upper casing section and bearing the full weight of the polisher, a handle rigidly attached to the upper casing section so that the handle, upper casing section and polisher member form a rigid unit, and a lower casing section removably attached to the upper casing section and enclosing the motor and a part of the polisher member for exposure of these elements on removal of the lower casing section.

2. A motor-driven polisher comprising an upper casing section, a motor having one end only fixed to the upper section, the motor including a shaft extending therefrom at said attached end, a rotatable polisher member fixed to the upper casing section, a driving belt extending from said extended end of the shaft to the polisher member, and a lower casing section attached to the upper casing section and enclosing the motor, belt and a part of the polisher member, both said casing sections having complementary wall portions reinforcing the casing sections closely embracing said motor intermediate its ends and forming with said one fixed end of the motor the supporting structure for the motor.

3. The polisher of claim 2 wherein said wall portions are substantially co-planar and the motor contacting edges thereof are provided with resilient gasket members.

PHILIP J. MORE.

References Cited in the file of this patent

UNITED STATES PATENTS

| Number | Name | Date |
|---|---|---|
| 1,572,987 | Campbell | Feb. 16, 1926 |
| 1,641,984 | Miller | Sept. 13, 1927 |
| 1,739,653 | Sassano | Dec. 17, 1929 |
| 1,819,800 | Turner | Aug. 18, 1931 |
| 1,908,399 | Boland | May 9, 1933 |
| 2,028,090 | Frantz | Jan. 14, 1936 |
| 2,099,172 | McCabe et al. | Nov. 16, 1937 |
| 2,247,970 | Smith | July 1, 1941 |
| 2,257,555 | Troxler | Sept. 30, 1941 |
| 2,300,938 | Lang | Nov. 3, 1942 |
| 2,345,514 | Troxler | Mar. 28, 1944 |
| 2,491,007 | Koch | Dec. 13, 1949 |
| 2,540,178 | Smith | Feb. 6, 1951 |

FOREIGN PATENTS

| Number | Country | Date |
|---|---|---|
| 598,919 | Great Britain | Mar. 1, 1948 |